United States Patent [19]
Nagano

[11] Patent Number: 5,166,811
[45] Date of Patent: Nov. 24, 1992

[54] IMAGE DATA PROCESSING APPARATUS

[75] Inventor: Fumikazu Nagano, Yamato-Koriyama, Japan

[73] Assignee: Sharp Kabushiki Kaisha, Osaka, Japan

[21] Appl. No.: 641,146

[22] Filed: Jan. 15, 1991

[30] Foreign Application Priority Data

Jan. 19, 1990 [JP] Japan .................. 2-9887

[51] Int. Cl.⁵ ............................................. H04N 1/04
[52] U.S. Cl. .................................... 358/483; 358/482; 358/213.26
[58] Field of Search ............... 358/400, 401, 443, 444, 358/445, 446, 448, 461, 464, 482, 483, 447, 213.26, 213.27, 213.28, 213.29, 431, 451, 465, 486; 340/710

[56] References Cited

U.S. PATENT DOCUMENTS

| | | | |
|---|---|---|---|
| 4,658,303 | 4/1987 | Nagano | 358/483 |
| 4,868,671 | 9/1989 | Murakami | 358/400 |
| 5,067,168 | 11/1991 | Nagano | 382/53 |

FOREIGN PATENT DOCUMENTS

| | | |
|---|---|---|
| 57-142068 | 9/1982 | Japan . |
| 58-106948 | 6/1983 | Japan . |
| 59-64963 | 4/1984 | Japan . |
| 59-221072 | 12/1984 | Japan . |

Primary Examiner—Jin F. Ng
Assistant Examiner—Edward Lefkowitz
Attorney, Agent, or Firm—David G. Conlin; Robert M. Asher

[57] ABSTRACT

An image data processing apparatus is provided for crisply reading a dark portion on an original. The image data processing apparatus includes a light source for applying a light ray to an original, a CCD sensor for receiving a light reflected by the original, converting the light into an electric signal and storing the electric signal, an analog processing circuit for receiving the electric signal from the CCD sensor and correcting the DC level of the electric signal, an analog-to-digital converter for receiving a corrected electric signal from the analog processing circuit and converting the corrected electric signal into a digital signal, a digital processing circuit for reading the digital signal from the analog-to-digital converter two or more times and adding the digital signal into one output signal, and a control section for controlling the CCD sensor, the analog processing circuit, the analog-to-digital converter and the digital processing circuit.

15 Claims, 6 Drawing Sheets

IMAGE DATA PROCESSING APPARATUS

BACKGROUND OF THE INVENTION

1. Field of the Invention

The present invention relates to an image data processing apparatus which can process image data.

2. Description of the Related Art

There have been heretofore proposed several kinds of image input devices. As one of the image input devices, a scanner can be referred. The scanner is constructed to apply a light ray to an original, writing or printing, receive a reflected ray, and convert the reflected ray into an electric signal with a CCD (Charge Coupled Device)sensor for the purpose of inputting original image data to an image processing apparatus such as a computer.

The relation between the light ray input from the original to the CCD sensor and an output voltage of the CCD sensor has a characteristic that it changes linearly when the CCD sensor receives strong reflected ray (bright) but it does non-linearly when the CCD sensor receives weak light ray (gloom). That is, in the latter case, the output voltage of the CCD sensor depends on the change of light intensity appearing on the light-receptacle surface less precisely than in the former case. It means that a bright portion included on the original image can be crisply represented but a dark portion cannot be so represented.

This is because a shift register included in the CCD sensor has as high a transfer efficiency as 99.9999% but the transfer efficiency of a sensor section to the shift register is as low as about 95%.

To enhance the transfer efficiency of the sensor section to the shift register, as disclosed in the Japanese Patent Application Laying Open (KOKOKU) No. 52-4436, there has been proposed an improvement which is constructed to apply constant biased light ray to the CCD sensor independently of the scanning light ray and increase an absolute amount of charges stored in a potential well.

As another improved method for enhancing the transfer efficiency, as disclosed in the Japanese Patent Application Laying Open (KOKAI) No. 57-142068, there has been also proposed an improvement which is constructed to gate the output of the CCD sensor in synchronous to a reset pulse for extracting effective signal components, integrate the effective signal components, and hold the result as a sample.

As another improved method, as disclosed in the Japanese Patent Application Laying Open (KOKAI) No. 58-106948, there has been also proposed an improvement which is constructed to rapidly transfer residual charges while the CCD sensor is storing the charges and open a transfer gate as stopping a more rapid transfer clock signal after finishing output of a reading-start signal.

As an alternative method, as disclosed in the Japanese Patent Application Laying Open (KOKAI) No. 59-64963, there has been further proposed an improvement which is constructed to extend the light-emitting time when the quantity of light traveled from a light source is made lower and shorten the light-emitting time when it is made higher, for the purpose of constantly keeping the photoelectric output of the CCD sensor stable.

As a further alternative method, as disclosed in the Japanese Patent Application Laying Open (KOKAI) No. 59-221072, there has been further proposed an improvement which is constructed to vary a charge-storing time in a half-tone reading mode and fix it in a black-and-white binary signal reading mode in accordance with a control signal. The improvement results in enhancing the accuracy of a captured image.

The aforementioned improvements, however, cannot sufficiently overcome the foregoing shortcoming that the output characteristic of the CCD sensor makes it impossible to crisply read out a dark portion of the original.

SUMMARY OF THE INVENTION

It is therefore an object of the present invention to provide an image data processing apparatus which is capable of crisply outputting a dark portion included on an original.

In carrying out the object in a preferred mode, the invention provides an image data processing apparatus which includes a light source for applying a light ray to an original, a CCD sensor for receiving a light reflected by the original, converting the light into an electric signal and storing the electric signal, an analog processing circuit for receiving the electric signal from the CCD sensor and correcting the DC (Direct Current) level of the electric signal, an analog-to-digital converter for receiving the corrected electric signal from the analog processing circuit and converting it into a digital signal, a digital processing circuit for reading the digital signal from the analog-to-digital converter two or more times and adding the read signals into one output signal, and a control section for controlling the CCD sensor, the analog processing circuit, the analog-to-digital converter, and the digital processing circuit.

In operation, at first, the light source for applying a light ray to an original serves to apply a light ray to the original for a constant time at regular periods in accordance with an indication sent from the control section, and then the reflected light ray is sent to the CCD sensor. The CCD sensor serves to convert the light ray into an analog electric signal and store the signal. Then, the analog processing circuit serves to correct the analog electric signal sent from the CCD sensor. The analog-to-digital converter serves to convert the analog electric signal corrected in the analog processing circuit into a digital signal. Then, the digital processing circuit serves to read a signal representing charges stored in the CCD sensor two or more times, the adder reads the stored signal two or more times and adds them. It results in allowing a dark portion on the original to be crisply represented.

Further objects and advantages of the present invention will be apparent from the following description of the preferred embodiment of the invention as illustrated in the accompanying drawings.

DESCRIPTION OF THE PREFERRED EMBODIMENTS

For describing the invention, the description will be directed to a scanner to which an image data processing apparatus according to the invention is applied with reference to FIGS. 1 to 8.

Figure 1:
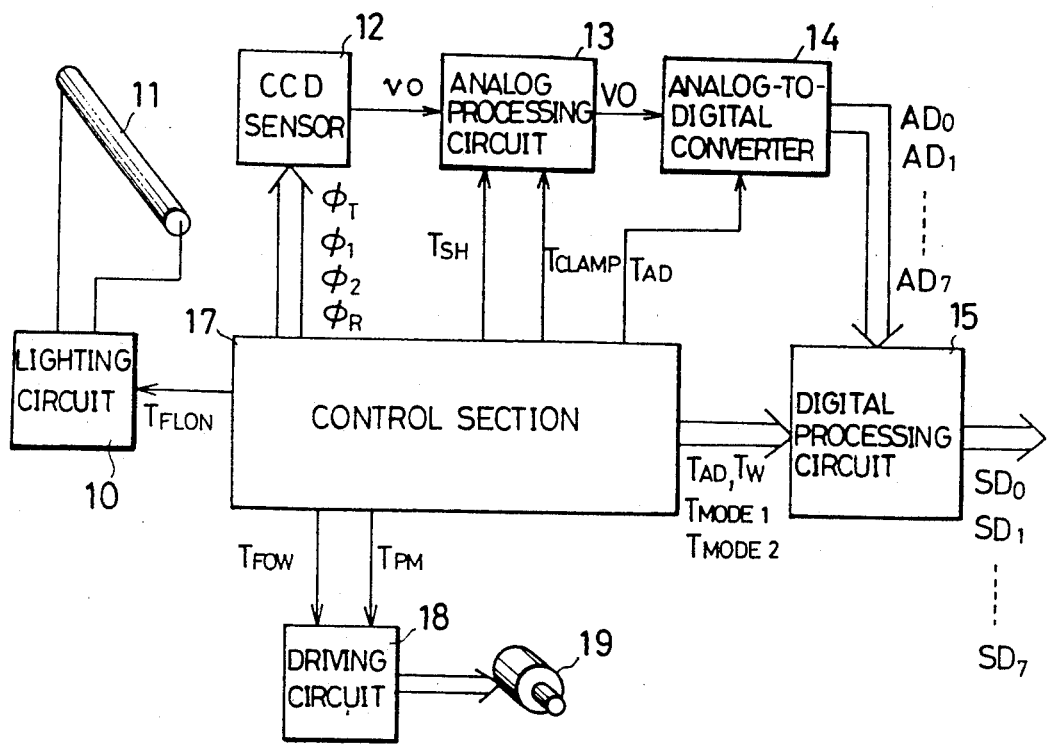
FIG. 1 is a block diagram showing an arrangement of a scanner to which an embodiment of the invention is applied.

FIG. 1 is a diagram showing the overall arrangement of the scanner.

11 denotes a fluorescent lamp and 12 denotes a CCD sensor. The scanner is constructed to read an original lighted by a fluorescent lamp 11 with the CCD sensor 12 and output a digital image signal.

10 denotes a lighting circuit to which the fluorescent lamp 11 is connected as an example of means for applying a light ray to an original. The fluorescent lamp 11 applies a light ray to the original. Then, the CCD sensor 12 receives the light ray reflected by the original. It is connected to an input of an analog processing circuit 13. The output of the analog processing circuit 13 is connected to an input of an analog-to-digital converter 14, the output of which is connected to an input of a digital processing circuit 15 including an adder.

17 denotes a control section which is connected to each input of the lighting circuit 10, the CCD sensor 12 and the analog processing circuit 13. The control section 17 is further connected to each input of the analog-to-digital converter 14, the digital processing circuit 15 and a driving circuit 18. The driving circuit 18 is connected to an input of a pulse motor 19.

The lighting circuit 10 serves to light on and off the fluorescent lamp 11 functioned as a light source for a constant time at regular periods in accordance with an indication sent from the control section 17. As the light source, a light-emitting diode may be also used if it has the corresponding switching characteristic to the lighting circuit 10. As an alternative means, it may be possible to keep the light source such as the fluorescent lamp 11, the light-emitting diode or a lamp active and mechanically light on and off the light source with a chopper (not shown).

The CCD sensor 12 serves to convert the light ray reflected by the original into an analog electric signal and store it. As an example, a CCD line sensor may be used.

The analog processing circuit 13 serves to correct the analog signal sent from the CCD sensor 12.

The analog-to-digital converter 14 serves to convert the analog signal corrected in the analog processing circuit 13 into a digital signal. For example, this analog-to-digital converter 14 converts an analog signal voltage of about 2 V to 4 V into an 8-bit (256 levels) digital signal. When, therefore, the CCD sensor 12 outputs a voltage vo of 4 V (black level, voltage level assumed when no light is reflected), the output signals $AD_0$ to $AD_7$ supplied by the analog-to-digital converter 14 all stay at logic level "0". When the CCD sensor 12 outputs an output voltage vo of 2 V (white level, saturation voltage level assumed when light is reflected, the output signals $AD_0$ to $AD_7$ all stay at logic level "1".

Figure 2:
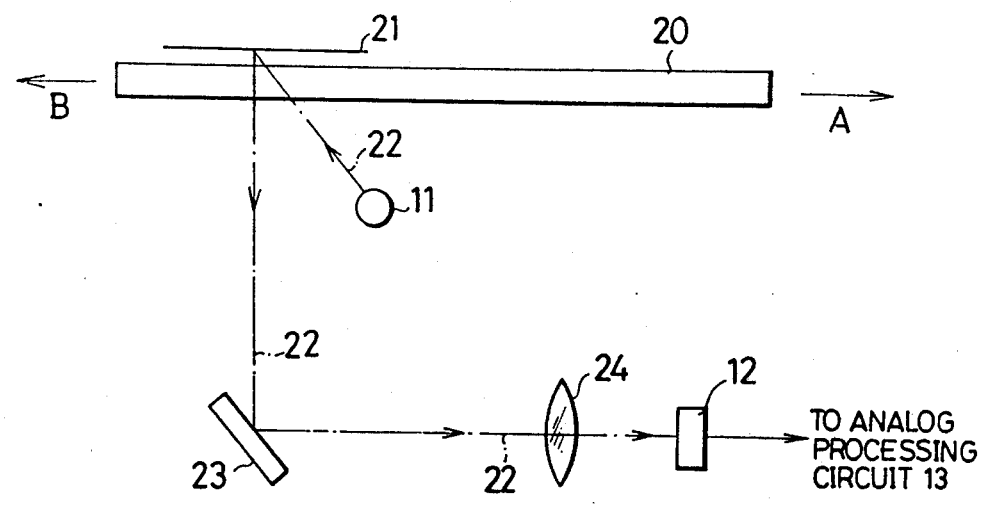
FIG. 2 is a view showing a positional relation between a lighting circuit and a CCD sensor included in the embodiment.

The driving circuit 18 is a circuit for driving the pulse motor 19 in accordance with an indication of the control section 17. The pulse motor 19 is driven by a direction control signal $T_{FOW}$ and a step-feed signal $T_{PM}$. When $T_{FOW}$ stays at logic level "0", as shown in FIG. 2, a glass table 20 is traveled toward an arrow A depending on the number of pulses contained in the step-feed signal $T_{PM}$. When $T_{FOW}$ stays at logic level "1", the glass table 20 is traveled toward an arrow B depending on the number of pulses contained in the step-feed signal $T_{PM}$. In place of the pulse motor, a DC (Direct Current) motor may be used for moving the glass table 20.

Turning to FIG. 1, the digital processing circuit 15 serves to read a signal representing charges stored in the CCD sensor 12 two or more times, add the read signal with the adder and output the adding result.

The control section 17 is a circuit which serves to control and generalize the operation of each circuit included in the scanner. For the control section 17, a microprocessor may be used.

FIG. 2 is a view for illustrating how the fluorescent lamp 11 is located with respect to the CCD sensor 12.

In FIG. 2, 20 denotes a glass table on which an original 21 is placed. The figure shows as if the glass table 20 is spaced from the original 21. In actual, however, the glass table 20 is in contact with the original 21. The combination of the glass table 20 and the original 21 is moved toward the arrow A or B by the pulse motor (not shown). The fluorescent lamp 11 is located so that its length is perpendicular to the original 21. The light ray 22 emitted from the fluorescent lamp 11 passes through the glass table 20 and reaches the original 21. The light ray 22 reflected by the original 21 again passes through the glass table 20 and reaches a mirror 23. Then, the light ray 22 reflected by the mirror 23 travels to a lens 24 through which it is focused. Hence, the focused light is applied onto the light-receptacle surface of the CCD sensor 12. The light-receptacle surface of the CCD sensor 12 is constructed so that it can receive linear reflected light ray 22.

The CCD sensor 12 converts the received light ray into an analog signal and then transmits the analog signal to the analog processing circuit 13. In this figure, the lens 24 employs a biconvex lens. In place of it, however, a plano-convex lens may be used.

Figure 3:
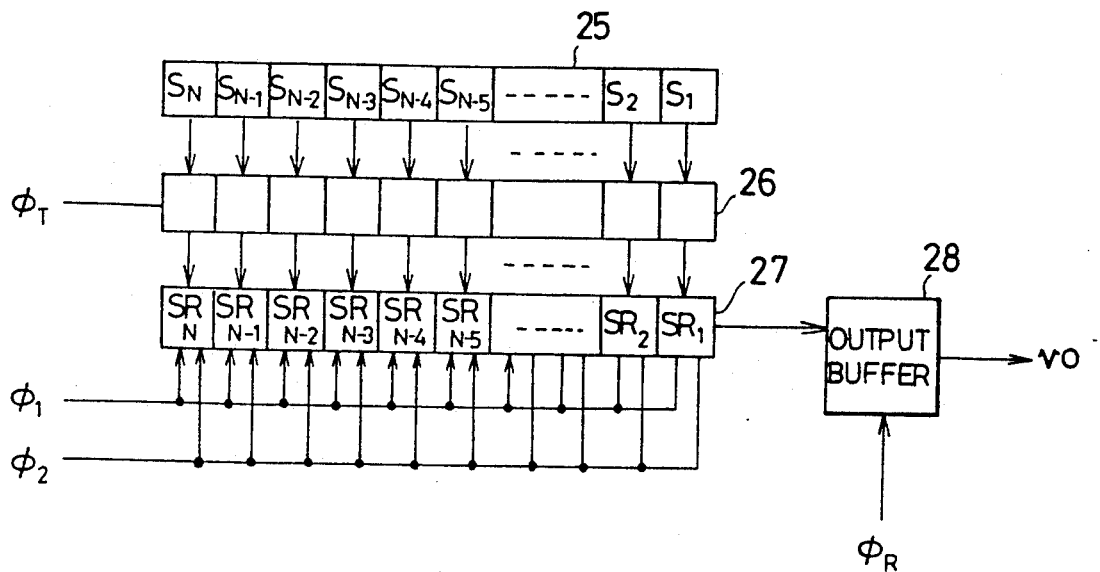
FIG. 3 is a diagram showing an arrangement of the CCD sensor included in the embodiment.

FIG. 3 is a diagram showing the arrangement of the CCD sensor 12.

In this figure, 25 denotes a sensor section (divided into $S_1$ to $S_N$ as shown in FIG. 3), which receives the light ray reflected by the original, converts it into N charges and stores them. The N charges are transferred to an analog shift register 27 ($SR_1$ to $SR_N$) through a transfer gate 26 functioned in synchronous to a transfer pulse $\phi_T$. Then, the analog shift register 27 functioned in synchronous to clock pulses $\phi_1$ and $\phi_2$ transfers the N charges to an output buffer 28 functioned in synchronous to a reset pulse $\phi_R$. Then, the output buffer 28 supplies an analog signal. The charges transferred to the output buffer 28 are thus synchronized with the reset pulse $\phi_R$, hence the output buffer 28 being reset each time the charge is transferred to it. Hence, an analog signal representing an image is sequentially transferred to the output buffer 28 in a one-pixel-by-one-pixel manner, resulting in the output buffer 28 supplying an output voltage vo. A minimum unit assumed on each light-receptacle surface of the sensor section 25 corresponds to one pixel.

Figure 4:
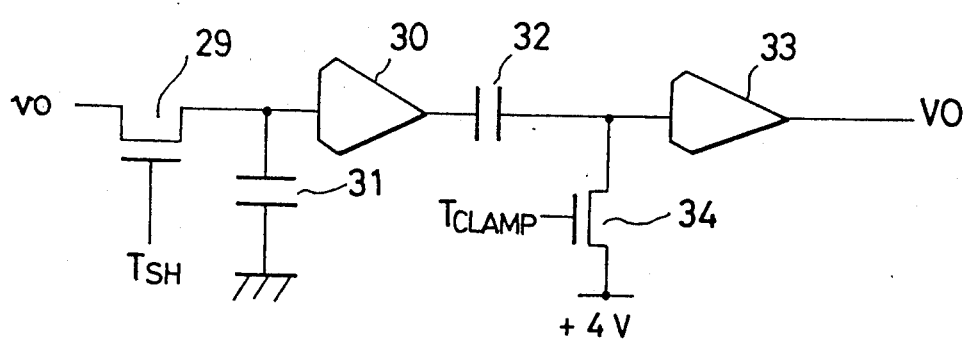
FIG. 4 is a circuit diagram showing an arrangement of an analog processing circuit included in the embodiment.

FIG. 4 is a circuit diagram showing an example of the analog processing circuit.

The analog processing circuit shown in FIG. 4 includes a MOS (Metal Oxide Semiconductor) transistors 29, 34, voltage followers 30, 33, and capacitors 31, 32. The MOS transistor 29 is served as an analog switch and is connected with the CCD sensor 12 so that it receives the output voltage vo of the CCD sensor 12. The other end of the MOS transistor 29 is connected to the input of the voltage follower 30 and the capacitor 31. The other end of the capacitor 31 is grounded. A sample pulse $T_{SH}$ is applied to the gate of the MOS transistor 29.

The output of the voltage follower 30 is connected with the voltage follower 33 and the MOS transistor 34 through the capacitor 32. Like the component 29, the MOS transistor 34 is served as an analog switch. A crank pulse $T_{CLAMP}$ is applied to the gate of the MOS transistor 34. The other end of the MOS transistor 34 is connected to a voltage supply (not shown) of +4 V, for example. It means that the MOS transistor 34 and the voltage follower 33 compose a clamp circuit.

Between the CCD sensor and the next-stage circuit, in general, a capacitor and a resistor (not shown) are connected in an AC (Alternating Current) coupling manner so that DC components of an image signal (representing the background of an original image) are removed. It results in requiring amplifying of the image signal and addition of the removed DC components. For addition of the removed DC components, that is, correction of the DC level, there is provided the clamp circuit.

The voltage follower 33 thus supplies the voltage V0 whose DC level is corrected.

As alternative components, the analog switch may be composed of a bipolar transistor or a diode in place of the MOS transistors 29 and 34.

Figure 5:
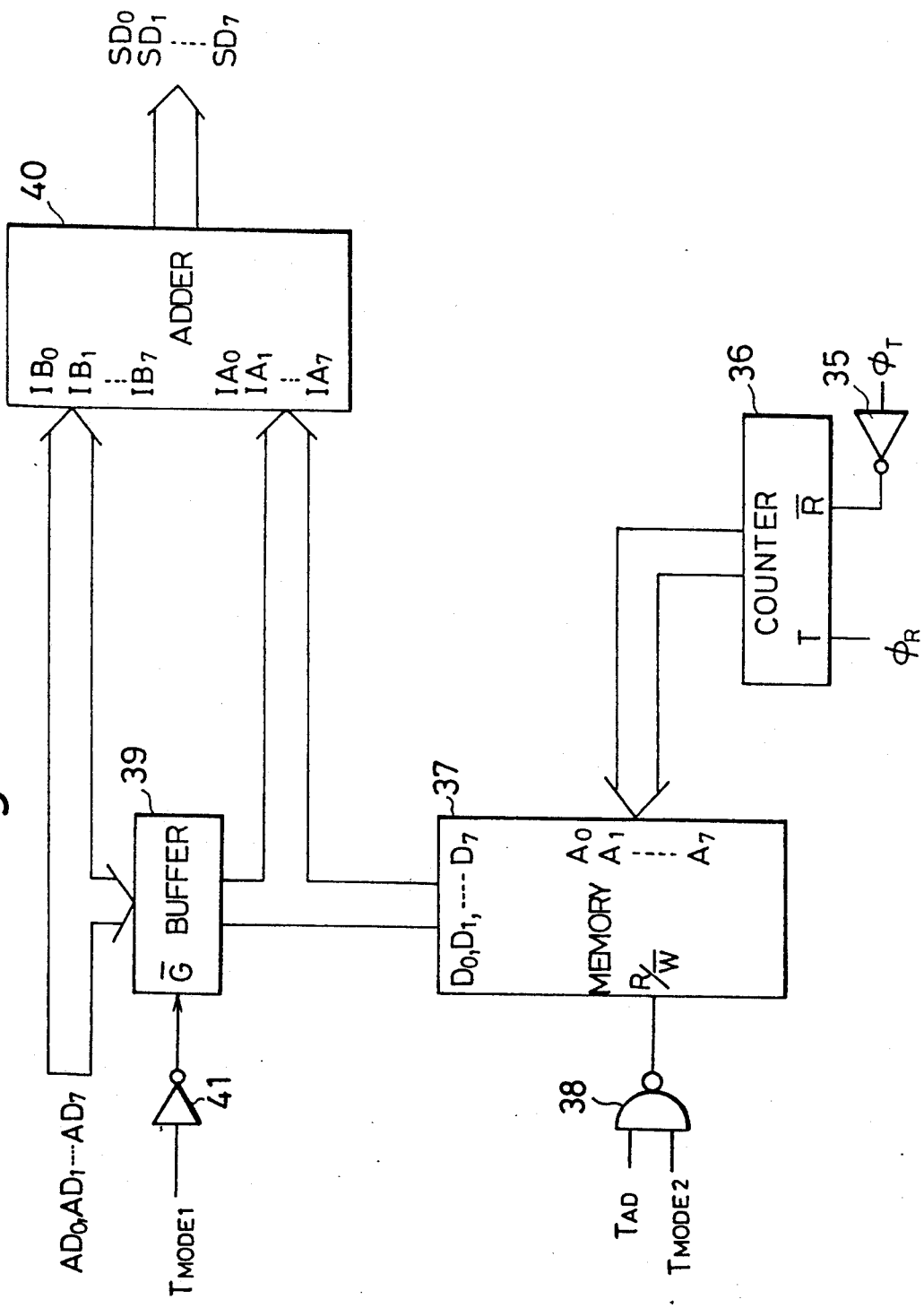
FIG. 5 is a block diagram showing a digital processing circuit included in the embodiment.

FIG. 5 is a circuit showing an example of the digital processing circuit 15.

Since it is an essential circuit for this embodiment, the digital processing circuit 15 will be discussed in detail with reference to FIG. 5.

As will be understood from FIG. 5, the digital processing circuit 15 mainly includes a counter 36, a memory 37, a buffer 39, and an adder 40, the counter 36 being connected at one input to an inverter 35, the memory 37 being connected to a two-input NAND gate 38, and the buffer 39 being connected to an inverter 41.

The counter 36 has two input terminals $\overline{R}$ and T, the former of which receives a transfer pulse $\phi_T$ inverted by the inverter 35 and the latter of which receives a reset pulse $\phi_R$. With the two pulses $\phi_T$ and $\phi_R$ being applied to the counter 36, the counter 36 supplies a pulse whose one period matches to the transfer pulse $\phi_T$ to address terminals $A_0$ to $A_7$ of the memory 37. Upon receiving one pulse, an address is specified, the address corresponding to the first-read portion of the signal representing the charges stored in the CCD sensor.

Turning to the two-input NAND gate 38, and AD pulse $T_{AD}$ and a pulse $T_{MODE2}$ are applied to the two-input NAND gate 38, the output of which is connected to an input terminal $R/\overline{W}$ of the memory 37.

In turn, the signals $AD_0$ to $AD_7$ sent from the analog-to-digital converter are applied to the buffer 39 and input terminals $IB_0$ to $IB_7$ of the adder 40. And, a pulse $T_{MODE1}$ is inverted in the inverter 41 and then is applied to an input terminal $\overline{G}$ of the buffer 39. The output of the buffer 39 is connected to both the input-output terminals $D_0$ to $D_7$ of the memory 37 and input terminals $IA_0$ to $IA_7$ of the adder 40. Then, the adder 40 supplies the corresponding output signals $SD_0$ to $SD_7$.

The buffer 39 employs a three-state buffer. When the input terminal $\overline{G}$ stays at logic level "0", the buffer 39 functions as a buffer amplifier and applies the signals $AD_0$ to $AD_7$ into the input-output terminals $D_0$ to $D_7$ of the memory 37 as keeping these signals in phase.

When the input terminal $\overline{G}$ stays at logic level "1", the output terminal of the buffer 39 is in a high-impedance state, that is, inactive, resulting in the data $AD_0$ to $AD_7$ sent from the analog-to-digital converter being applied to the input terminals $IB_0$ to $IB_7$ of the adder 40.

The memory 37 serves to store data sent from the analog-to-digital converter. It employs a RAM. When the input terminal $R/\overline{W}$ of the memory 37 stays at logic level "0", that is, the AD pulse $T_{AD}$ and the pulse $T_{MODE2}$ both have logic level "1", the memory 37 enters into a write mode. At that time the buffer 39 is made active so that the data $AD_0$ to $AD_7$ sent from the analog-to-digital converter are allowed to be written in the memory 37.

When the input terminal $R/\overline{W}$ stays at logic level "1", the memory 37 enters into a read mode. At that time, the output terminal of the buffer 39 remains in the high-impedance state, that is, is made inactive. Hence, the data read from the memory 37 are applied to the input terminals $IA_0$ to $IA_7$ of the adder 40.

In addition, the memory 37 may employ a floppy disk or hard disk in place of the RAM.

The adder 40 serves to add both data sent from the analog-to-digital converter and the memory 37 and output the adding result.

The output signals $SD_0$ to $SD_7$ of the adder 40 can be represented by the equation:

$$\sum_{n=0}^{n=7} SD_n \cdot 2^n = \sum_{n=0}^{n=7} (IB_n + IA_n) \cdot 2^n$$

wherein $IB_n$ and $IA_n$ denote input data.

Figure 6:
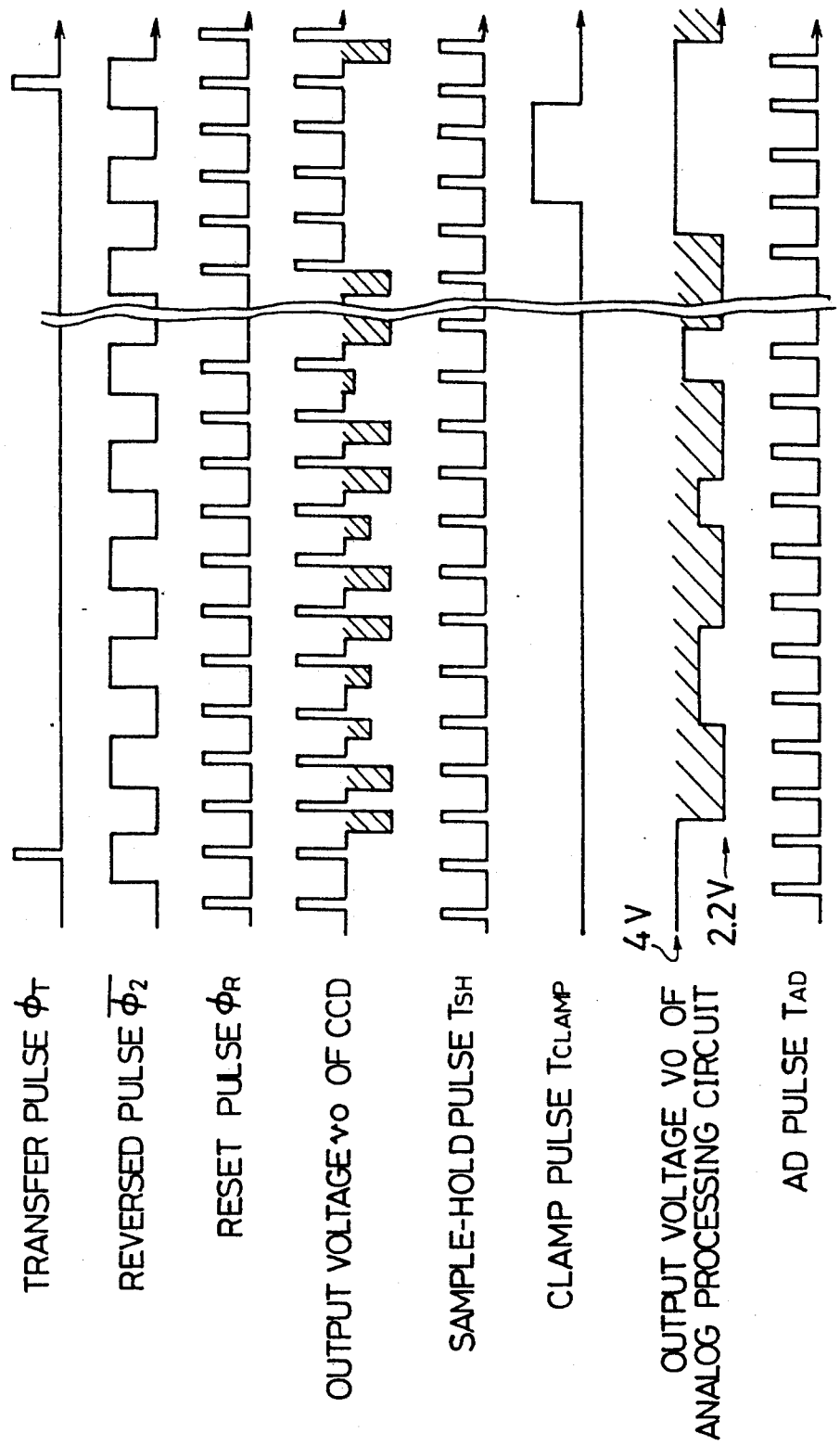
FIG. 6 is a time chart showing waveforms of pulses applied in the components included in the embodiment.
Figure 7:
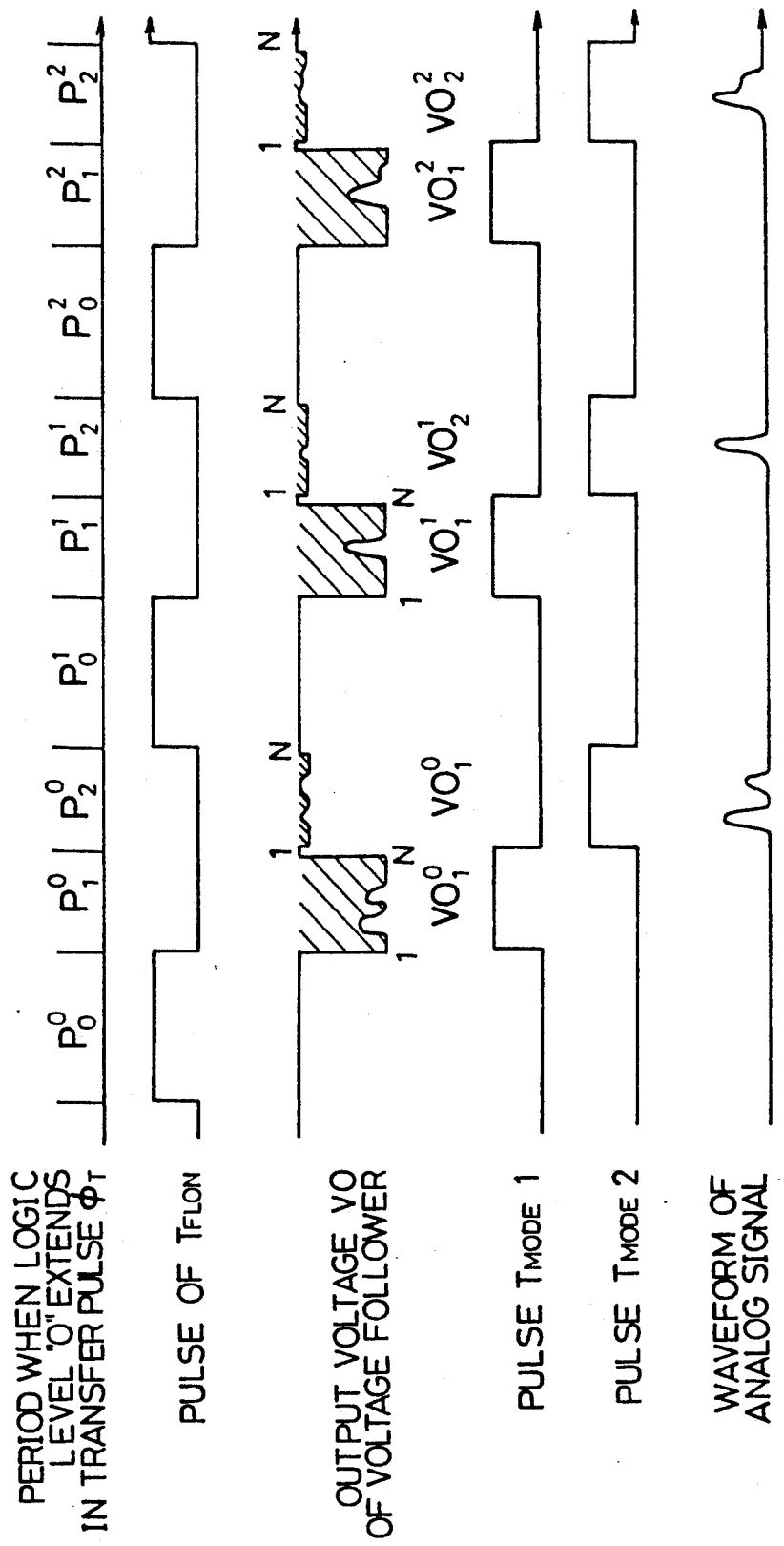
FIG. 7 is a time chart showing waveforms of pulses applied in the components included in the embodiment.

In turn, the description will be directed as to how the scanner works with reference to FIG. 1 and FIGS. 6 and 7.

In FIG. 1, the fluorescent lamp 11 serves to intermittently apply a light ray to the original (not shown) in accordance with a pulse $T_{FLON}$ (see a pulse of FIG. 7) sent from the control section 17. The light reflected by the original is received by the CCD sensor 12.

On the other hand, the transfer pulse $\phi_T$ is applied to the transfer gate of the CCD sensor 12 (see a pulse of FIG. 6).

The clock pulses $\phi_1$ and $\phi_2$ (see a pulse of FIG. 6, wherein the shown pulse is a reversed one $\phi_2$ of these clock pulses) are applied to the shift register of the CCD sensor 12.

In turn, the reset pulse $\phi_R$ is applied to the output buffer of the CCD sensor 12 (see a pulse of FIG. 6).

The transfer pulse $\phi_T$, clock pulses $\phi_1$, $\phi_2$ and reset pulse $\phi_R$ are supplied by the control section 17. In synchronous to the clock pulses $\phi_1$, $\phi_2$, the CCD sensor 12 serves to convert the light ray reflected by the original into N charges representing the original image and serially transfer the N charges to the output buffer. Each time the charge is transferred to the output buffer 28, it is reset in the buffer functioning in synchronous to the reset pulse $\phi_R$. For each charge, the output buffer 28 transfers the corresponding output voltage vo (see a pulse of FIG. 6) to the analog processing circuit 13.

The analog processing circuit 13 functions in synchronous to the sample-hold pulse $T_{SH}$ (see a pulse of FIG. 6) and a clamp pulse $T_{CLAMP}$ (see a pulse of FIG. 6). The circuit 13 serves to correct the DC level of the output voltage vo from the CCD sensor 12 as a voltage VO in synchronous to these pulses and transfer the corrected voltage VO to the analog-to-digital converter 14.

The analog-to-digital converter 14 serves to convert the output voltage VO into a digital signal in synchronous to the AD pulse $T_{AD}$ (see a pulse of FIG. 6) supplied from the control section 17. Then, the analog-to-digital converter 14 transfers the digital signal to the digital processing circuit 15.

In FIG. 5, when the digital signals $AD_0$ to $AD_7$ transferred from the analog-to-digital converter 14 match to the first-output charges (meaning the charges output by the CCD sensor 12 for the first time), the buffer 39 works as a buffer amplifier in synchronous to the pulse $T_{MODE1}$ (see a pulse of FIG. 7) supplied from the control section 17 (see FIG. 1). At a time, the memory 37 enters into a write mode, so that the digital signal $AD_0$ to $AD_7$ are allowed to be stored at the addresses $A_0$ to $A_7$ of the memory 37.

When the digital signals $AD_0$ to $AD_7$ transferred from the analog-to-digital converter 14 match to the second-output charges, the output terminal of the buffer 39 stays in a high-impedance state. The digital signals $AD_0$ to $AD_7$ matching to the second-output charges are applied to the input terminals $IB_0$ to $IB_7$ of the adder 40. At that time, the memory 37 enters into a read mode in synchronous to the pulse $T_{MODE2}$ (see a pulse of FIG. 7) supplied from the control section. As such, the digital signals $AD_0$ to $AD_7$ matching to the first-output charges are applied into the input terminals $IA_0$ to $IA_7$ of the adder 40.

The adder 40 serves to add those digital signals applied to the input terminals $IB_0$ to $IB_7$ and $IA_0$ to $IA_7$ and output the resulting signals $SD_0$ to $SD_7$. For more easily understanding the output digital signals, the output digital signal is converted into an analog signal in a digital-to-analog converter (not shown). The waveform of the analog signal is denoted as a pulse of FIG. 7. It indicates the pulse where the image signal received by the adder 40 for the first time is added to that received for the second time.

In FIG. 7, $P^m{}_n$ (m=0, 1 or 2 and n=0, 1, 2, ...) in the transfer pulse $\phi_T$ applied to the transfer gate of the CCD sensor indicates a period when the logic level "0" extends in the transfer pulse $\phi_T$. $P^m{}_n$ is arranged to have:

$$P^0{}_0 = P^0{}_1 = P^0{}_2 = \ldots = P^0{}_n$$

$$P^1{}_0 = P^1{}_1 = P^1{}_2 = \ldots = P^1{}_n$$

$$P^2{}_0 = P^2{}_1 = P^2{}_2 = \ldots = P^2{}_n.$$

Hence, one period means the addition of $P^0{}_n + P^1{}_n + P^2{}_n$ and tripled periods of logic level "1". The duty cycle of the transfer pulse $\phi_T$ is set so that it is relevant to the characteristic of the CCD sensor and the reading times.

The periods matching to $P^0{}_0$, $P^1{}_0$, $P^2{}_0$, ... of the transfer pulse $\phi_T$ indicate periods when the CCD sensor integrates the charges. The periods matching to $P^0{}_1$, $P^1{}_1$, $P^2{}_1$, ... of the transfer pulse $\phi_T$ indicate periods when the CCD sensor outputs the first data (about 95% of the charges stored in the sensor).

The periods matching to $P^0{}_2$, $P^1{}_2$, $P^2{}_2$, ... indicate periods when the CCD sensor outputs the second data (the charges left out of those transferred in synchronous to the first transfer pulse $\phi_T$), that is, the CCD sensor reads a residual image. The second data for the residual image are added to the first data when the CCD sensor supplies the output. This is a feature of the embodiment.

That is, according to this embodiment, assuming that $V_{OUT}$ denotes the output voltage of the CCD sensor, $V_{OUT}$ can be represented as $V_{OUT} = V0^1{}_n + V0^2{}_n$.

Figure 8:
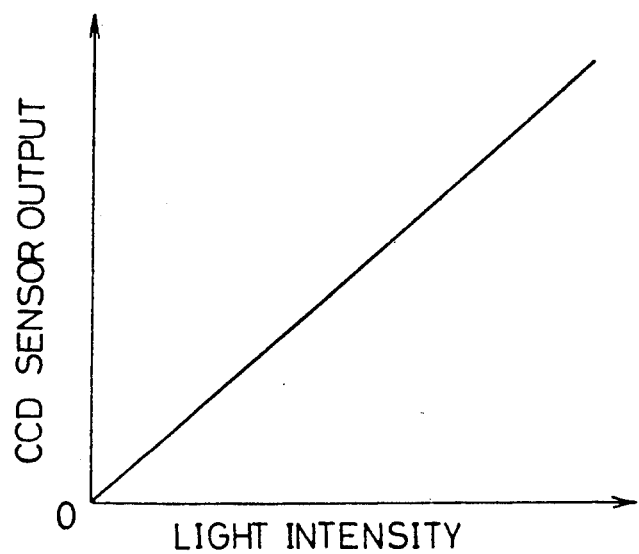
FIG. 8 is a graph showing a relation between an output voltage of the CCD sensor and the intensity of light received in the CCD sensor according to the embodiment.
Figure 9:
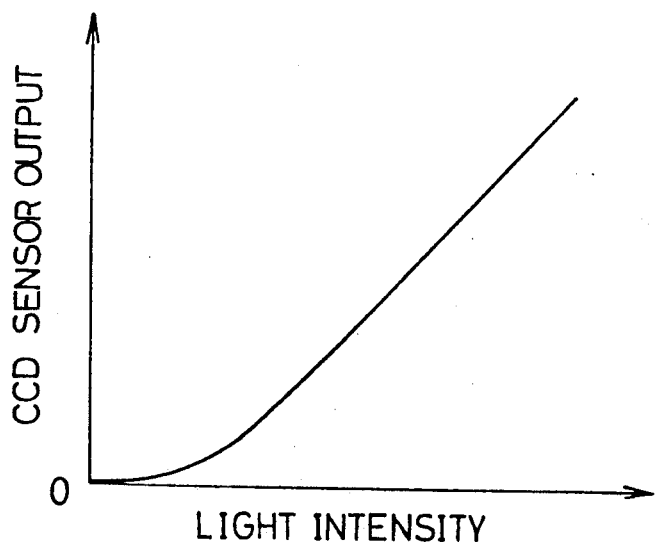
FIG. 9 is a graph showing a relation between an output voltage of a CCD sensor and the intensity of light received in the CCD sensor according to a known image data processing apparatus.

As a result, the feature makes it possible to provide the linear relation between the quantity of light received by the CCD sensor and the output of the CCD sensor as shown in FIG. 8. It means that a dark portion on the original can be crisply output. On the other hand, a known image data processing apparatus offers the non-linear relation between the quantity of light received by the CCD sensor and the output of the CCD sensor as shown in FIG. 9.

As mentioned above, the present embodiment is constructed so that the CCD sensor can read the data twice. However, the reading time is not limited to two. The CCD sensor may read the data three times.

Further, the present embodiment is constructed so that the output of the CCD sensor is temporarily stored in memory and then is sent to the adder for adding the second output. As an alternative means, for example, the use of a delay line or shift registers makes it possible to delay a first output time of the CCD sensor for adding the first output to the second output.

The image data processing apparatus may be applied not only to the scanner but also a copier or a facsimile.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image data processing apparatus comprising:
    means for applying a pulse of light to an original;
    a CCD sensor for converting the pulse of light reflected by said original into electric signals and storing said electric signals;
    means for reading said stored electric signals after said pulse of light has been applied and for thereafter successively reading residual electric signals from said CCD sensor one or more times while said applying means is still not applying said light to said original; and
    an adder for receiving said stored electric signals and said residual electric signals from said reading means and adding said stored electric signals to said residual electric signals.

2. An image data processing apparatus according to claim 1, wherein said CCD sensor includes a sensor section, a transfer gate, an analog shift register and an output buffer.

3. An image data processing apparatus according to claim 2, wherein said sensor section, said transfer gate and said analog shift register are respectively divided into N units, where N is an integer.

4. An image data processing apparatus according to claim 1, wherein said apparatus is applied to a scanner.

5. An image data processing apparatus according to claim 1, wherein said apparatus is applied to a copier.

6. An image data processing apparatus according to claim 1, wherein said apparatus is applied to a facsimile.

7. An image data processing apparatus comprising:
a light source for applying a pulse of light to an original;
a CCD sensor for receiving the pulse of light reflected by said original, converting said pulse of light into an electric signal and storing said electric signal;
an analog processing circuit for receiving said electric signal from said CCD sensor and correcting the DC level of said electric signal;
an analog-to-digital converter for receiving a corrected electric signal from said analog processing circuit and converting said corrected electric signal into a digital signal;
a digital processing circuit for reading said digital signal from said analog-to-digital converter after said pulse of light has been applied and for thereafter successively reading residual electric signals from said CCD sensor one or more times while said applying means is still not applying said light to said original, and adding said digital signal to said residual signals while said light source is still not applying said light to said original; and
a control section for controlling said CCD sensor, said analog processing circuit, said analog-to-digital converter and said digital processing circuit.

8. An image data processing apparatus according to claim 7, wherein said digital processing circuit includes an adder.

9. An image data processing apparatus according to claim 7, wherein said CCD sensor includes a sensor section, a transfer gate, an analog shift register and an output buffer.

10. An image data processing apparatus according to claim 9, wherein said sensor section, said transfer gate and said analog shift register are respectively divided into N units, where N is an integer.

11. An image data processing apparatus according to claim 7, wherein said analog processing circuit includes a first MOS transistor served as an analog switch, a first voltage follower, a capacitor, a second voltage follower and a second MOS transistor connected to a four-voltage supply, said second voltage follower and said second MOS transistor composing a clamp circuit.

12. An image data processing apparatus according to claim 7, wherein said digital processing circuit includes a buffer, an adder, a memory and a counter, said buffer functioning as inputting signals sent from said analog-to-digital converter into said memory depending on a pulse sent from said control section, said memory for storing and outputting said signals depending on the pulse sent from said control section, said counter specifying an address for said signal stored in said memory, and said adder serving to add the next signals sent from said analog-to-digital converter and the corresponding signals stored in said memory into the output signals and supply said output signals.

13. An image data processing apparatus according to claim 7, wherein said apparatus is applied to a scanner.

14. An image data processing apparatus according to claim 7, wherein said apparatus is applied to a copier.

15. An image data processing apparatus according to claim 7, wherein said apparatus is applied to a facsimile.

* * * * *